June 21, 1927.                                                                  1,633,454
C. B. MILLS
ELECTROMAGNETIC POWER TRANSMITTING MEANS
Filed July 12, 1921                2 Sheets-Sheet 1

Inventor
CHESTER B MILLS
By his Attorney
Herbert H. Thompson

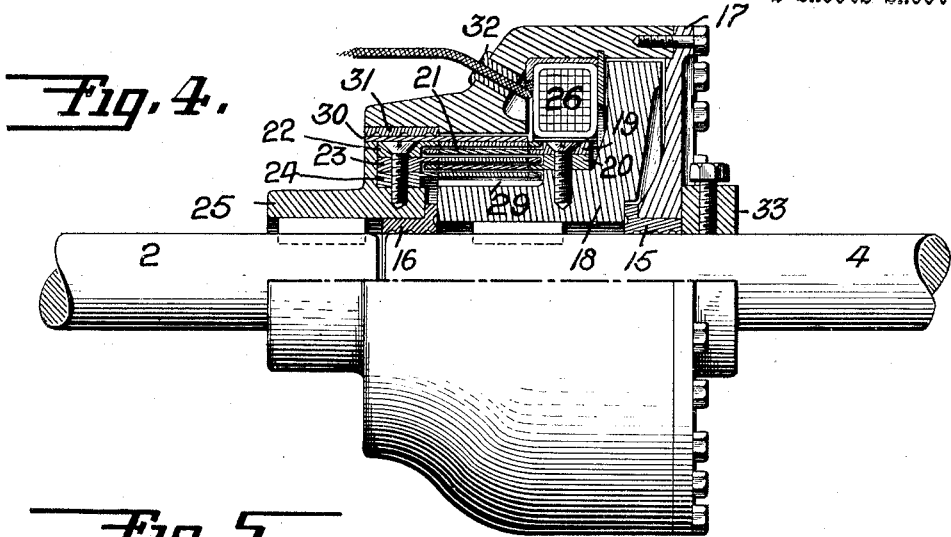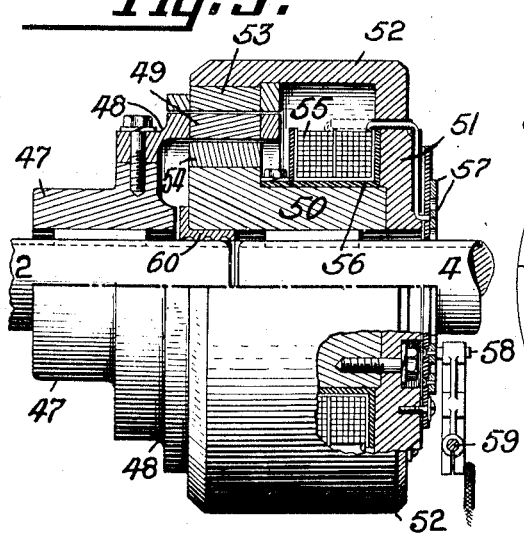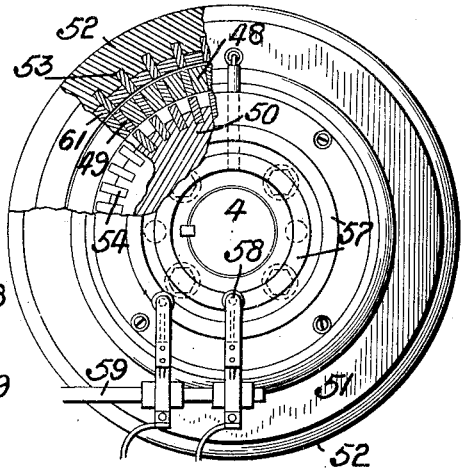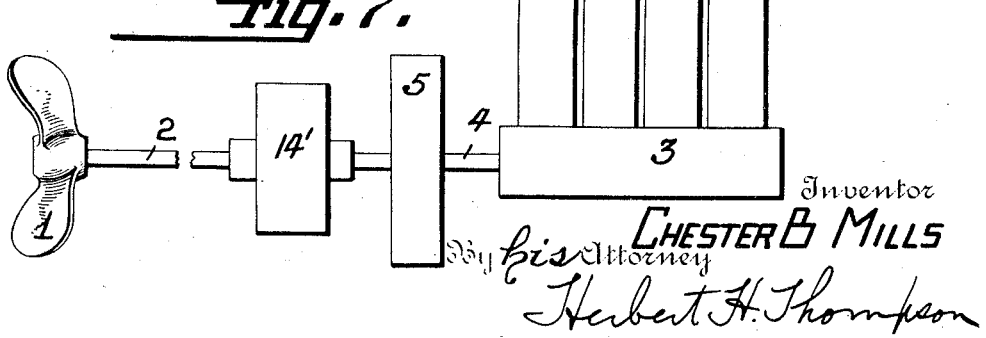

Patented June 21, 1927.

1,633,454

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

ELECTROMAGNETIC POWER-TRANSMITTING MEANS.

Application filed July 12, 1921. Serial No. 484,045.

This invention relates to electro-magnetic means for transmitting power. One of the objects of the invention is to provide a variable speed control particularly useful in tug boat service whereby a Diesel or other oil burning engine of limited speed control may be used to drive the tug boat and at the same time a range of speeds suitable for tug boat service provided. As is well known, great flexibility of speed is essential in tug boat service, especially since very low speeds must be provided around docks and harbors. The required low speed cannot be obtained by means of a Diesel engine, however, since, with the present construction of needle-valve, an attempt to obtain low speeds results in complete throttling of the engine. By the means which I have provided a tug boat or ship may be driven by a Diesel engine and the required low speeds of the propeller obtained by utilizing the energy of said engine.

Another object of my invention is the provision of an improved type of magnetic torque applying device or clutch designed to occupy a minimum of room.

A further object is the provision of a magnetic torque applying device wherein the passage of magnetic flux through a series of magnetic elements, part of which are connected to a driven member and part to a driving member, tends to align the magnetic elements connected to the driven member with those connected to the drive member, thus causing the driven member to rotate in synchronism with the drive member; and wherein means are further provided whereby, when any difference in speed occurs between the driving and driven members, circulating currents are induced in certain material of high electrical conductivity surrounding said inserts, or a part of them, and these currents tend to bring the driving member into synchronism with the driven member. Since the magnitude of the induced currents increases with the difference in speed of said members, it will be seen that an especially high torque at starting may be produced.

Another object is the provision of electromagnetic means interposed between a prime mover and a load for reducing the speed of the latter. By connecting between the load and the prime mover an electro-magnetic torque applying device of the type above specified, the speed at which the load is driven may be effectively reduced; and the necessity of employing reduction gearing, with the disadvantages incident thereto, may thus be eliminated.

Referring to the drawings wherein I have shown what I now consider the preferred forms of my invention:

Fig. 4 is a side elevation, partly in section, of an improved type of torque applying device.

Fig. 5 is a side elevation, partly in section, of another form of torque applying device.

Fig. 6 is an end elevation, partly in section, of the torque applying device of Fig. 5.

Fig. 7 is a diagrammatic view showing my improved torque applying device interposed between an engine and a propeller shaft, whereby the latter may be driven at reduced speeds.

Figure 1:
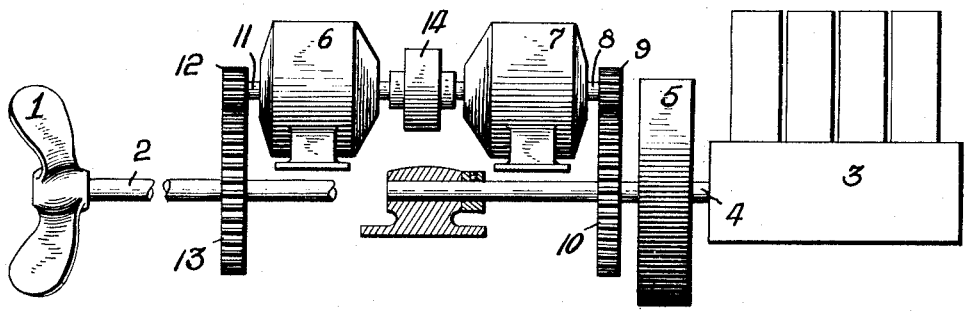
Fig. 1 is a diagrammatic side elevation of one form which the variable speed control means may assume.
Figure 2:
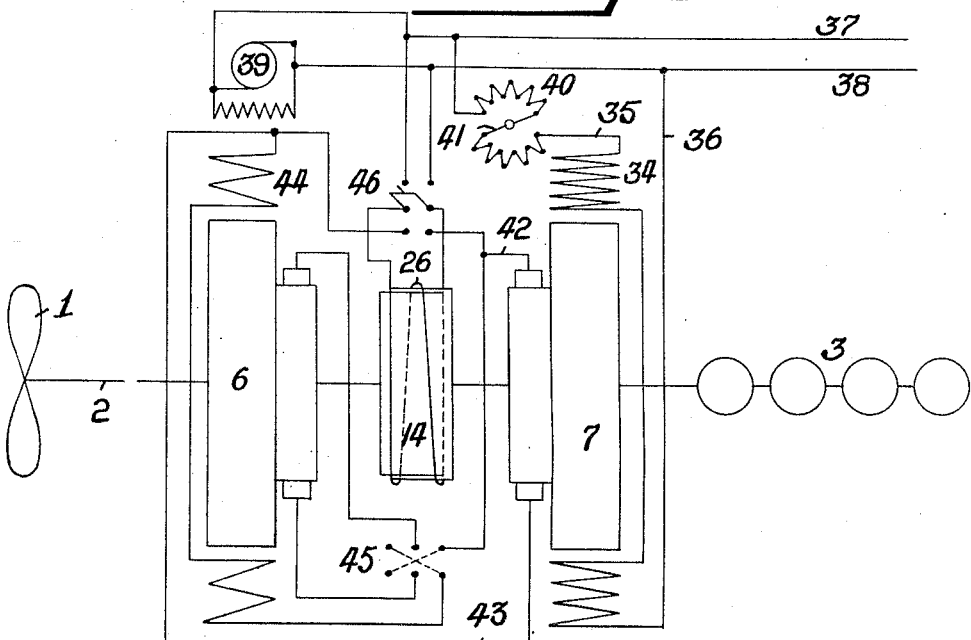
Fig. 2 is a diagrammatic view of another form of speed control means showing the wiring therefor.
Figure 3:
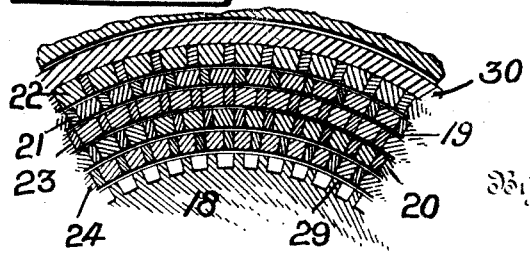
Fig. 3 is a fragmentary detail cross-sectional view of the torque applying device shown in Fig. 4.

The speed control systems of Figs. 1 and 2 and the magnetic clutch structure of Figs. 3 and 4 are divided out of my copending application, Serial No. 364,684, filed March 10, 1920, for "variable speed driving means". The present application is a continuation in part of said copending application.

In Figs. 1 and 2 I have shown a propeller 1 mounted on a shaft 2 which is adapted to be driven by a Diesel or other engine 3 having the usual crank shaft 4 and flywheel 5. For driving the propeller shaft 2 at speeds not readily attainable by engine 3 I have shown an electric motor 6 connected with the said shaft and energized by a generator 7, which may be an ordinary direct current generator, driven by engine 3. Motor 6 and generator 7 may be connected in various ways with shafts 2 and 4, respectively. By way of example, I have shown in Fig. 1 the shaft 8 of generator 7 connected to engine shaft 4 through gearing 9, 10, and shaft 11 of motor 6 connected through gearing 12, 13 with propeller shaft 2. Of course, the armature of generator 7 may, if desired, be driven directly by shaft 4 and the armature of motor 6 may drive shaft 2 directly, as shown in Fig. 2.

Interposed between the shafts 2 and 4 I have shown a torque transmitting device or clutch 14 by means of which shafts 2 and 4 may be connected when it is desired to drive the propeller by engine 3 and disconnected when motor 6 is to be used for driving the propeller. The aforesaid torque transmitting device may be interposed between said shafts at any desired point. Thus, in Fig. 1, I have shown said device located between shafts 8 and 11, while in Fig. 2 it is interposed directly between shafts 2 and 4. Of course, any suitable or conventional type of torque applying or transmitting device may be used. At present I prefer to utilize an electromagnetic torque applying device. In Figs. 3 and 4 I have shown an improved type of such device which may be constructed substantially as follows:

The driving shaft, which in this case may be crank shaft 4, is shown rotatable at one end in a bearing 15 of Babbitt metal provided in a stationary casing 17. Keyed to shaft 4 is a member 18 to which are secured, as by screws or otherwise, a plurality of annular members 19 and 20 of non-magnetic material having bars or inserts 21 of magnetic material. Other annular members 22, 23, and 24 of non-magnetic material, likewise provided with magnetic inserts 21, are secured to a member 25 keyed to shaft 2 and rotatable on centering bearing member 16 of Babbitt metal which is interposed between shafts 2 and 4 to maintain suitable gaps between the respective annular members. It will be seen that annulus 22 surrounds annulus 19, annulus 19 surrounds annulus 23, annulus 23 surrounds annulus 20, etc. The magnetic bars or inserts 21 with which the aforementioned annular members are provided are shown extending in a direction parallel to the axis of shafts 2 and 4 and are equi-distantly spaced in a circumferential direction. The number of inserts on any of the members is equal to the number of inserts on any other member. In order to increase the torque of the device, that portion of member 18 which extends into annulus 24 may be grooved to provide teeth 29 which correspond to the magnetic inserts in any one of the annular members both in spacing and in number.

For passing magnetic flux through the torque applying device I have shown a magnetizing coil 26 mounted in stationary casing 17. For the purpose of providing a ready path for the magnetic flux to the inserts 21, as well as to provide a suitable closure for the gap between member 25 and the end of casing 17 into which said member 25 extends, I have shown an annular member 30 of steel or other magnetic material interposed between member 25 and casing 17 and surrounding the magnetic inserts 21. Preferably, annulus 30 is shrunk on member 25 and is rotatable in a bearing portion 31 of casing 17. An insulating bushing 32 may be provided in casing 17 as shown for receiving the conductors leading to the coil 26.

When coil 26 is energized it will be seen that the magnetic flux will pass through the top part of casing 17, sleeve 30, inserts 21, teeth 29, member 18, and back into casing 17 and will tend to maintain the magnetic inserts 21 of the respective annular members in alignment, thereby causing propeller shaft 2 to follow driving shaft 4. For preventing movement of shaft 4 to the right, as shown in Fig. 4, a collar 33 may be screwed or otherwise attached to the said shaft.

In the construction of torque transmitting device which I have shown in Fig. 4, it should be noted that the coil 26 is stationary and is at the same time protected against water and oil. Furthermore, the parts of the torque transmitting device are arranged in such manner as to take up the minimum of room, thereby enabling casing 17 to be made as small as possible and at the same time providing a compact structure.

For utilizing generator 7 and motor 6 to drive the propeller at speeds beyond the range of speeds attainable by engine 3 various connections may be provided. I have shown one form of such connections in Fig. 2, wherein the field 34 of generator 7 is shown connected through wires 35 and 36 with the mains 37, 38. While the latter may be supplied with current by a storage battery or other suitable source of supply, I have shown them connected with a generator 39, which may also be utilized to furnish current for lighting or other purposes. A suitable rheostat 40 having a movable contact arm 41 is shown inserted in the field connections for varying the voltage furnished by the generator 7 and consequently the speed of the motor. Wires 42, 43 lead from the generator to the field 44 and armature of motor 6, the latter being shown as a series motor. A reversing switch 45 is provided to vary the direction of current from generator 7 through the armature of motor 6 with respect to the field thereof. Another switch 46 may be provided as shown for connecting coil 26 of torque transmitting device 14 with either mains 37, 38 or the generator 7.

The operation of the above construction will now be readily understood. For propeller speeds readily attainable by engine 3, for example, 125 to 250 R. P. M., coil 26 is energized and the connections between motor 6 and generator 7 broken. Propeller shaft 2 may then be driven directly by the engine 3. When it is desired to drive the propeller at speeds not readily attainable by engine 3, as for example, 30 to 125 R. P. M., coil 26 is deenergized and connections between motor 6 and generator 7 established by switch 45. The speed at which the propeller shaft is driven by the motor may be varied by moving contact arm 41 to throw different amounts of resistance in series with the field of the generator. Since the power required to drive a ship's propeller varies as the cube of the velocity, it will be seen that a comparatively small motor is sufficient to drive the propeller at speeds lower than those attainable through engine 3.

The magnetic clutch described above may be employed wherever it is desired to transmit power from one member to another. In this type of clutch the torque due to the tendency of the magnetic flux to align the inserts 21 is a maximum when the driving and driven members are in synchronism and decreases rapidly as the difference in speed between said members increases. Consequently it is necessary to bring the driven member substantially into synchronism with the driving member before the aforesaid torque becomes sufficient to transmit rotation from the driving to the driven member. Heretofore it has been necessary to employ means other than the clutch, such as a generator coupled to the driving member and electrically connected to a motor coupled to the driven member, for bringing the driven member substantially up to the speed of the driving member. I have found that by making the non-magnetic annular members 19—24 of a material of high electrical conductivity, such as copper, a powerful torque tending to bring the driven shaft into synchronism with the drive shaft results from the inducing of electric currents in said material whenever there is slippage between said shafts. When the inserts 21 are surrounded by high conductivity material, as aforesaid, a difference in speed between the driving and driven shafts causes the amount of flux through said inserts to vary, and this variation in flux results in the inducing of currents in said high conductivity material; whereupon a torque tending to bring the driven shaft up to the speed of the drive shaft is produced. The magnitude of the induced currents, and hence of the torque resulting therefrom, increases as the difference between the speeds of said shafts increases so that a very powerful starting torque may be obtained. The necessity of employing means other than the clutch for bringing the driven shaft into synchronism with the drive shaft is thus avoided. Since the torque due to the tendency of the magnetic flux to keep the inserts 13 aligned, which may be termed the torque due to magnetic induction, as distinguished from the torque due to the currents induced in the copper rings, reaches its maximum value when the driving and driven shafts are in alignment, it will be seen that with the clutch aforesaid there is obtained both a powerful starting torque and a powerful torque when the driving and driven shafts are in synchronism, due to the combined effects of the torque due to magnetic induction and the torque due to the current effects in the annular members. In other words, the torque due to the induced currents, which may be termed the torque due to electromagnetic induction, increases with an increase in speed difference between the shafts, while the torque due to magnetic induction increases as said speed difference decreases and reaches its maximum when synchronism between said shafts is attained. The combined effects of these torques produces a resultant torque of great magnitude both at starting, at synchronous speed of the shafts, and at intermediate speeds. While it is not necessary that all the annular members 19—24 be made of high conductivity material, the torque due to electro-magnetic induction aforesaid is greater in proportion to the number of said members that are of such material.

When material of high electrical conductivity is employed around the magnetic inserts, as aforesaid, the generator and motor may be omitted in the systems shown in Figs. 1 and 2, and the necessary reduced speeds of the propeller may be produced by the clutch itself. In Fig. 7 I have shown the shaft 2 of propeller 1 and the shaft 4 of engine 3 connected solely by a magnetic clutch 14' of the type above described wherein the magnetic inserts are surrounded by high conductivity material. By suitably varying the current through the exciting coil 26 the propeller may be driven at reduced speeds from the engine 3, or in synchronism therewith, as desired. For example, the maximum current through said coil may produce sufficient flux to bring the propeller 1 quickly into synchronism with the engine shaft 4. On the other hand the current through the exciting coil may be weakened to such an extent that the torque due to the eddy currents induced in the high conductivity material around the inserts is insufficient to bring the propeller up to synchronism with shaft 4, so that said propeller will be driven at a lower speed than said shaft. Thus, by suitably weakening the exciting current, the propeller 1 may be driven at any of a variety of reduced speeds by the engine 3 and low speeds of the propeller which could not be obtained with a non-slip one-to-one connection between the engine and propeller are thus attainable. The current in the exciting coil 26 may be varied in any conventional manner.

It will thus be seen that with a magnetic clutch such as I have devised, wherein the magnetic inserts are surrounded by material of high electrical conductivity, not only may tug-boat drive systems such as shown in Figs. 1 and 2 be simplified, but, furthermore, reduced speeds of a driven member may be obtained wherever desired without the necessity of employing reduction gearing. My improved magnetic clutch may thus be substituted for reduction gearing, and the wear of parts and other disadvantages present when gearing is employed may thus be avoided.

The form of clutch preferred at present is shown in Figs. 5 and 6. Keyed to the shaft 2 is a collar 47 to which is secured an annular member 48 of non-magnetic material provided with inserts 49 of magnetic material. A collar 50 is keyed to shaft 4 and has bolted or otherwise secured thereto at one end thereof a member 51 having an annular flange 52 which overhangs said collar. The flange 52, collar 50 and member 51 thus form a rotatable member having a portion C-shaped in cross-section. Teeth 53 corresponding in spacing and number with the magnetic inserts 49 are suitably secured in slots in the flange 52 and project radially toward said inserts. Similar teeth 54 are mounted in slots in collar 50 as shown. The teeth 53 and 54 are of magnetic material as are also collar 50 and member 51 and flange 52. The teeth 53, 54 and inserts 49 are shown mounted within the gap of the C-shaped portion above referred to. A magnetizing coil 55 is supported by collar 50 within the gap of said C-shaped portion. Although the said coil is composed of insulated wire, it may be separated from collar 50 and member 51 by additional insulating material 56 as an added precaution. Current is led to said coil through suitable conductors connected to slip rings 57 carried by member 51. Brushes 58 mounted on a suitable support 59 lead current to said slip rings. A centering bearing 60 is interposed between collar 50 and shaft 2 and serves to maintain suitable gaps between teeth 53, 54 and inserts 49.

It will be seen that when coil 55 is energized magnetic flux passes through member 51, flange 52, teeth 53, inserts 49, teeth 54, collar 50, and back to member 51 thus tending to align inserts 49 with teeth 53 and 54. The annular member 48 is preferably of a material of high electrical conductivity as has been discussed above in connection with members 19—24 of Fig. 4, so that electric currents may be readily induced therein when slippage between shafts 2 and 4 occurs. To further increase the torque due to induced currents, the teeth 53 may be embedded in a ring 61 of non-magnetic, high conductivity, material, in which electric currents are induced at the same time as in ring 48. A high starting torque may thus be obtained. The action of the clutch of Figs. 5 and 6 is, of course, similar to that discussed in connection with the clutch of Fig. 4. It will be noted, however, that the number of gaps which the flux must traverse is reduced in the clutch of Figs. 5 and 6, so that less magneto-motive force is required to cause a given amount of flux to pass through the magnetic teeth and inserts. The size of the coil can thus be reduced as can also the size of the entire clutch, since the number of parts of the latter is minimized. The annular member 48 may at the same time be made thicker than the corresponding annular members of Fig. 1 and its resistance thereby decreased.

It should further be noted that the teeth 53, 54 are separable from the flange 52 and collar 50, respectively. This permits of utilizing teeth of a material of higher magnetic permeability than said flange and collar. The latter, for instance, are generally made of cast steel, whereas, by providing separable teeth the latter may be made of silicon steel, which is considerably more permeable magnetically than the cast steel. The torque of the device may thus be increased considerably. The teeth 54 may be embedded in high-conductivity non-magnetic material, similarly to teeth 53, if desired, in order to obtain a still more powerful starting torque. In the clutch constructions shown in Figs. 4, 5 and 6 it will be apparent that either of shafts 2, 4 may be employed as the drive shaft and the other as the driven shaft.

In accordance with the patent statutes, I have herein described the principle of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. An electro-magnetic clutch comprising a ring of non-magnetic material of high electrical conductivity connected with a rotatable member, a row of independent spaced magnetic elements carried by said ring, an annular row of independent spaced magnetic elements connected with a second rotatable member and surrounding the first mentioned elements, a second annular row of independent spaced magnetic elements connected with the last-mentioned rotatable member and surrounded by the first-mentioned elements, and means for passing magnetic flux through said rows of elements.

2. An electro-magnetic clutch as specified in claim 1, characterized by high conductivity material surrounding the elements connected to the second rotatable member for the purpose specified.

3. An electro-magnetic clutch comprising a ring of non-magnetic material secured to a rotatable member and carrying a plurality of spaced magnetic inserts, an annular row of spaced magnetic elements secured to a second rotatable member, and a ring of non-magnetic material of high electrical conductivity in which said elements are embedded.

4. An electro-magnetic clutch comprising a ring of non-magnetic material of high electrical conductivity and adapted to be secured to a rotatable member, a group of spaced magnetic inserts embedded therein, a second member of non-magnetic material of high electrical conductivity and adapted to be secured to a second rotatable member, a second group of magnetic inserts embedded therein, and means for passing magnetic flux through said inserts whereby one of said members may drive the other.

5. In an electro-magnetic clutch as specified in claim 1, a ring of non-magnetic material of high electrical conductivity in which is embedded one of the rows of elements connected to the second rotatable member.

6. In combination with a driving member and a driven member, an annular row of spaced magnetic teeth connected with one of said members, a ring of non-magnetic material of high electrical conductivity connected with the other of said members and surrounded by said row of teeth, spaced inserts of magnetic material carried by said ring, an annular row of spaced magnetic teeth connected with the same member as the first mentioned teeth and surrounded by said ring, and means for passing magnetic flux through said inserts and said teeth.

7. In combination with a driving member and a driven member, means for causing said driven member to be driven from said driving member at a lesser speed than the later; said means comprising a plurality of spaced rows of magnetic elements secured to one of said members, a row of magnetic elements secured to the other of said members and interposed between the first mentioned rows, non-magnetic material of high electrical conductivity surrounding at least a portion of said magnetic elements, and means for passing magnetic flux through said elements.

8. In combination, a rotatable member, a ring of non-magnetic material connected thereto, spaced magnetic inserts carried by said ring, a second rotatable member, an annular row of magnetic teeth surrounding said inserts, a second annular row of magnetic teeth surrounded by said inserts, means of magnetic material connected with said second rotatable member for supporting said rows of teeth, said teeth being separably mounted in slots in said supporting means and being of a material of higher magnetic permeability than said supporting means, and means for passing magnetic flux through said inserts and said teeth.

9. In a speed reduction means for ships, in combination, a ship engine shaft, a propeller shaft, a magnetic coupling between said engine and propeller shafts comprising a ring of non-magnetic material of high conductivity secured to the engine shaft, a second ring of non-magnetic material of high conductivity secured to the propeller shaft, each of said rings being provided with a plurality of spaced magnetic bars, the two rings being placed in overlapping relation, means for passing a magnetic flux through said rings and means for varying said flux to vary the slip between said rings.

In testimony whereof I have affixed my signature.

CHESTER B. MILLS.